C. J. SPERRY & L. CHANDLER.
Bee-Hives.
No. 143,307. Patented September 30, 1873.
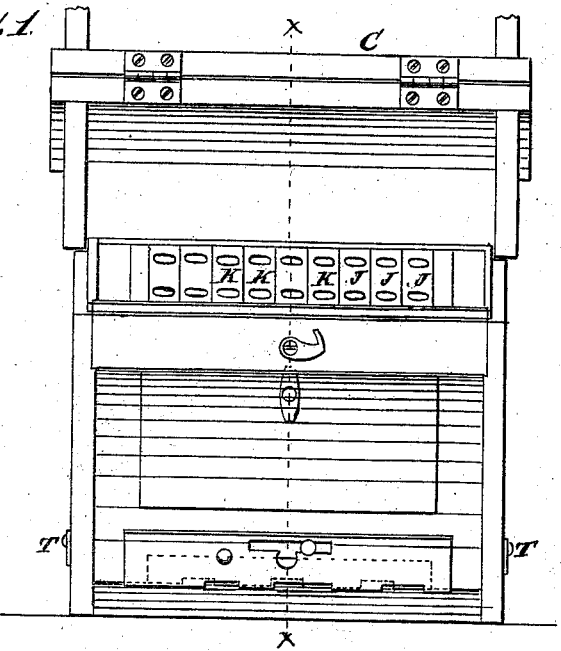
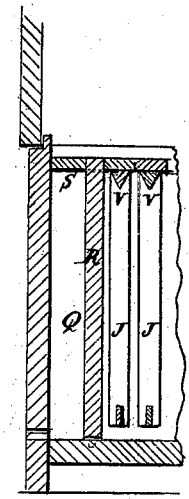
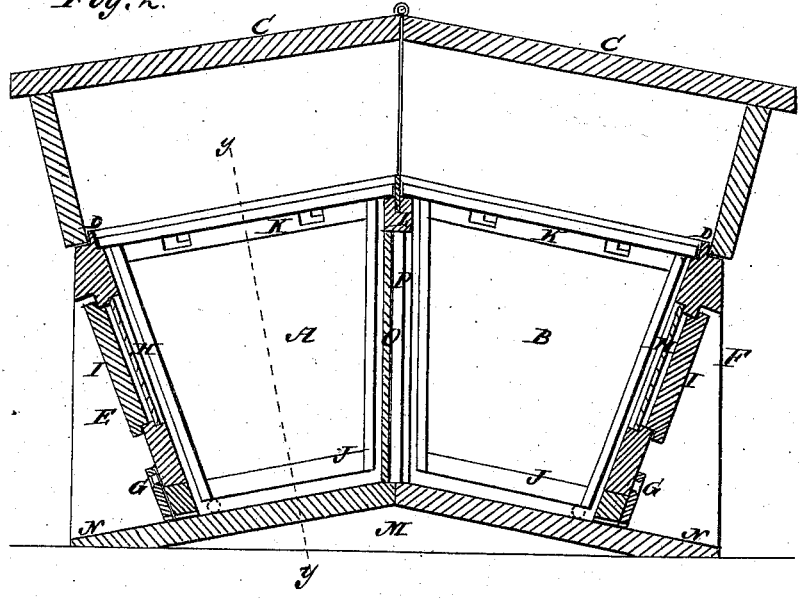
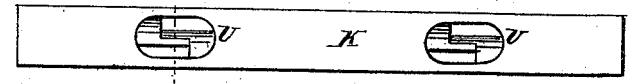
Witnesses:
Inventor:
Per
Attorneys.

UNITED STATES PATENT OFFICE.

CHARLES J. SPERRY AND LYMAN CHANDLER, OF NEW LONDON, MINN.

IMPROVEMENT IN BEE-HIVES.

Specification forming part of Letters Patent No. 143,307, dated September 30, 1873; application filed May 31, 1873.

*To all whom it may concern:*

Be it known that we, CHARLES J. SPERRY and LYMAN CHANDLER, of New London, in the county of Kandiyohi, and State of Minnesota, have invented a new and useful Improvement in Bee-Hives, of which the following is a specification:

The object of this invention is to furnish an improved hive for the protection and cultivation of honey-bees; and it consists in the construction, arrangement, and combination of parts, hereinafter described.

In the accompanying drawing, Figure 1 is an end view with one side of the hinged roof or cover thrown up to show the top of the honey-frames. Fig. 2 is a vertical section of Fig. 1 taken on the line $x\,x$. Fig. 3 is a section of Fig. 2 taken on the line $y\,y$. Fig. 4 is a view of the top of one of the honey-frames. Fig. 5 is a vertical section of Fig. 4 taken on the line $z\,z$.

Similar letters of reference indicate corresponding parts.

This is a double bee-hive with two sets of honey-frames. A and B represent the two main compartments, which contain the honey-frames. C is the roof or cover made in two parts hinged together at the center, as seen in Fig. 2. The roof fits over a flange, D, which surrounds the top of the hive. E and F represent the two fronts of the hive, in which are the bee-entrances G G, and observation glass windows H H, covered by the wood shutters I I. J represents the honey-frames, which are suspended from cleats attached to the hive by means of the projecting ends of the top pieces K of the frames. L is a cross-piece through the center of the hive. M represents the bottom of the hive, consisting of two inclines corresponding in form with the roof. The edges of these inclines form the bee lighting-boards N N at the two fronts of the hive. O represents a slat partition extending from the cross-piece L to the center or ridge of the floor. P is a shutter, which closes the communication between the two parts of the hive. When the shutter is reversed, the bees can pass freely from one part to the other. This is a great convenience in dividing swarms. On the opposite side outside of honey-frame of each part E F of the hive there is a compartment, Q, closed by means of the movable partition R, and a top slat, S. The partition is hinged or pivoted at the bottom, so that when the loose slat S is removed the top of the partition will drop over against the side, which allows the honey-frames to be removed without difficulty. The queen-bees, one or more, can be propagated and kept separate by means of these compartments. T represents entrance-holes to these compartments, covered by sliding shutters, as seen in the drawing. U represents bee-entrances through the top bars of the honey-frames. These apertures are of peculiar construction, as seen in Figs. 4 and 5. These apertures are formed by cutting out the top part and inclined under sides of the bar, leaving the bottom part entire, the object being to avoid weakening the bar and to form passages for the bees, through which they may pass up or down on either side of the comb or comb-frame. V represents the comb-guides beneath the top bars of the honey-frames. The general form and style of the hive is seen in Fig. 2.

Having thus described our invention, we claim as new, and desire to secure by Letters Patent—

1. The hinged partitions R and top piece S, arranged substantially as shown and described.

2. The slat partition O and shutter P, arranged between the two compartments A and B of the hive, as and for the purpose specified.

3. The top bar K of the comb-frames, provided with the apertures U having dividing-bars, as and for the purpose specified.

CHARLES J. SPERRY.
LYMAN CHANDLER.

Witnesses:
ORLANDO F. SPERRY,
H. SWENSON.